United States Patent
Yount et al.

(10) Patent No.: US 7,840,316 B2
(45) Date of Patent: Nov. 23, 2010

(54) LIMITED AUTHORITY AND FULL AUTHORITY MODE FLY-BY-WIRE FLIGHT CONTROL SURFACE ACTUATION CONTROL SYSTEM

(75) Inventors: Larry J. Yount, Scottsdale, AZ (US);
Gerald B. Kelley, Glendale, AZ (US);
Kent A. Stange, Phoenix, AZ (US);
Welsh C. Pond, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 372 days.

(21) Appl. No.: 11/957,665

(22) Filed: Dec. 17, 2007

(65) Prior Publication Data

US 2009/0152404 A1    Jun. 18, 2009

(51) Int. Cl.
*G01C 23/00*    (2006.01)
(52) U.S. Cl. .............................. 701/3; 701/4; 244/194; 318/564
(58) Field of Classification Search .............. 701/3, 701/4, 11, 14, 15, 16; 244/17.13, 194, 196; 340/945, 967; 318/564
See application file for complete search history.

(56) References Cited

U.S. PATENT DOCUMENTS

| | | | |
|---|---|---|---|
| 6,366,837 B1 | 4/2002 | Yount et al. | |
| 6,443,399 B1 | 9/2002 | Yount et al. | |
| 6,561,463 B1 | 5/2003 | Yount et al. | |
| 6,650,973 B2 | 11/2003 | Yamamoto | |
| 7,017,861 B1 | 3/2006 | Johansson et al. | |
| 7,182,296 B2 | 2/2007 | Yount et al. | |
| 7,209,809 B2 | 4/2007 | Yeh | |
| 2002/0002428 A1 | 1/2002 | Kubica | |
| 2003/0120399 A1 | 6/2003 | Yamamoto | |
| 2004/0078120 A1 | 4/2004 | Melkers et al. | |
| 2005/0085957 A1 | 4/2005 | Yeh | |
| 2006/0041339 A1 | 2/2006 | Silvestro | |
| 2006/0043242 A1 | 3/2006 | Benson | |
| 2006/0100750 A1 | 5/2006 | Platzer et al. | |
| 2007/0007385 A1 | 1/2007 | Potter et al. | |
| 2007/0083301 A1 | 4/2007 | Yeh | |
| 2007/0109745 A1* | 5/2007 | Yeh | 361/695 |
| 2007/0145180 A1 | 6/2007 | Johnson et al. | |
| 2007/0164166 A1 | 7/2007 | Hirvonen | |

* cited by examiner

*Primary Examiner*—Gertrude Arthur Jeanglaud
(74) *Attorney, Agent, or Firm*—Ingrassia Fisher & Lorenz, P.C.

(57) ABSTRACT

An aircraft flight control surface actuation control system includes an actuator control unit and a flight control module. The actuator control unit includes at least two independent actuator control channels to generate limited authority flight control surface actuator commands based on pilot inceptor position signals and flight control augmentation data. The flight control module supplies the flight control augmentation data to each of the independent actuator control channels, determines operability of each of the actuator control channels and, based on the determined operability of each independent actuator control channel, selectively prevents one of the independent actuator control channels from supplying the limited authority flight control surface actuator commands. The flight control module may also generate full authority flight control surface actuator commands for supply to flight control surface actuators.

20 Claims, 2 Drawing Sheets

LIMITED AUTHORITY AND FULL AUTHORITY MODE FLY-BY-WIRE FLIGHT CONTROL SURFACE ACTUATION CONTROL SYSTEM

TECHNICAL FIELD

The present invention generally relates to aircraft flight control and, more particularly, to a multi-authority mode fly-by-wire flight control surface actuation control system.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation control system. The flight control surface actuation control system, in response to position commands that originate from either the flight crew or an aircraft autopilot, moves the aircraft flight control surfaces to the commanded positions. In most instances, this movement is effected via actuators that are coupled to the flight control surfaces. Typically, the position commands that originate from the flight crew are supplied via one or more user interfaces or inceptors. For example, many aircraft include duplicate inceptors, such as yokes and pedals, one set each for the pilot and for the co-pilot. Either of the pilot or co-pilot inceptors can be used to generate desired flight control surface actuator commands.

Most modern aircraft are equipped with fly-by-wire flight control surface actuation systems. A typical fly-by-wire system includes, among other devices, electronic sensors, actuator control units, and flight control modules (FCMs). The electronic sensors are coupled to, and sense the positions of, the inceptors, and transmit inceptor position signals to the actuator control units. The FCMs receive aircraft state data supplied from various sensors that monitor the state of the aircraft in flight (e.g., inertial sensors and air data sensors). The FCMs, based at least in part on the aircraft state data, transmit augmentation data to the actuator control units. The actuator control units, which are sometimes referred to as actuator control electronics (ACEs), generate actuator position commands in response to the inceptor position signals and the augmentation data.

The electronic systems and/or sub-systems that are used in aircraft may be subject to various regulatory standards of verification rigor. These standards can prevent or inhibit integration of these electronic systems with other functionalities. These standards can also lead to increased overall implementation costs for such systems, including fly-by-wire systems. There is a desire in the aircraft industry for reduced cost electronic systems, such as fly-by-wire systems. One way of reducing these costs would be to integrate at least portions of the fly-by-wire system with other functionalities. However, presently known fly-by-wire system configurations cannot be integrated with other functionalities and still meet verification rigor standards.

Hence, there is a need for a reduced cost fly-by-wire system that meets verification rigor standards and/or may be at least partially integrated with other functionalities. The present invention addresses at least this need.

BRIEF SUMMARY

In one embodiment, and by way of example only, an aircraft flight control surface actuation control system includes an actuator control unit and a flight control module. The actuator control unit includes at least two independent actuator control channels. Each independent actuator control channel is coupled to receive pilot inceptor position signals and flight control augmentation data. Each independent actuator control channel is operable to generate limited authority flight control surface actuator commands based on the pilot inceptor position signals and the flight control augmentation data. The flight control module is in operable communication with the actuator control unit. The flight control module is configured to supply the flight control augmentation data to each of the independent actuator control channels, determine operability of each of the actuator control channels, and, based on the determined operability of each independent actuator control channel, to selectively prevent one of the independent actuator control channels from supplying the limited authority flight control surface actuator commands.

In another exemplary embodiment, an aircraft flight control surface actuation control system includes an actuator control unit, a flight control module, and a mode select switch. The actuator control unit is coupled to receive pilot inceptor position signals and flight control augmentation data. The actuator control unit is operable to generate limited authority flight control surface actuator commands based on the pilot inceptor position signals and the flight control augmentation data. The flight control module is in operable communication with the actuator control unit, and is operable to supply the flight control augmentation data to the actuator control unit, at least selectively generate full authority flight control surface actuator commands, and supply a mode select control signal. The mode select switch is coupled to receive the limited authority flight control surface actuator commands, the full authority flight control surface actuator commands, and the mode select control signal. The mode select switch is operable, in response to the mode select control signal, to supply either the limited authority flight control actuator commands or the full authority flight control surface actuator commands.

Other desirable features and characteristics of the user interface system will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although much of the invention is depicted and described as being implemented in fixed-wing aircraft, the invention may also be used in rotary-wing aircraft.

Figure 1:
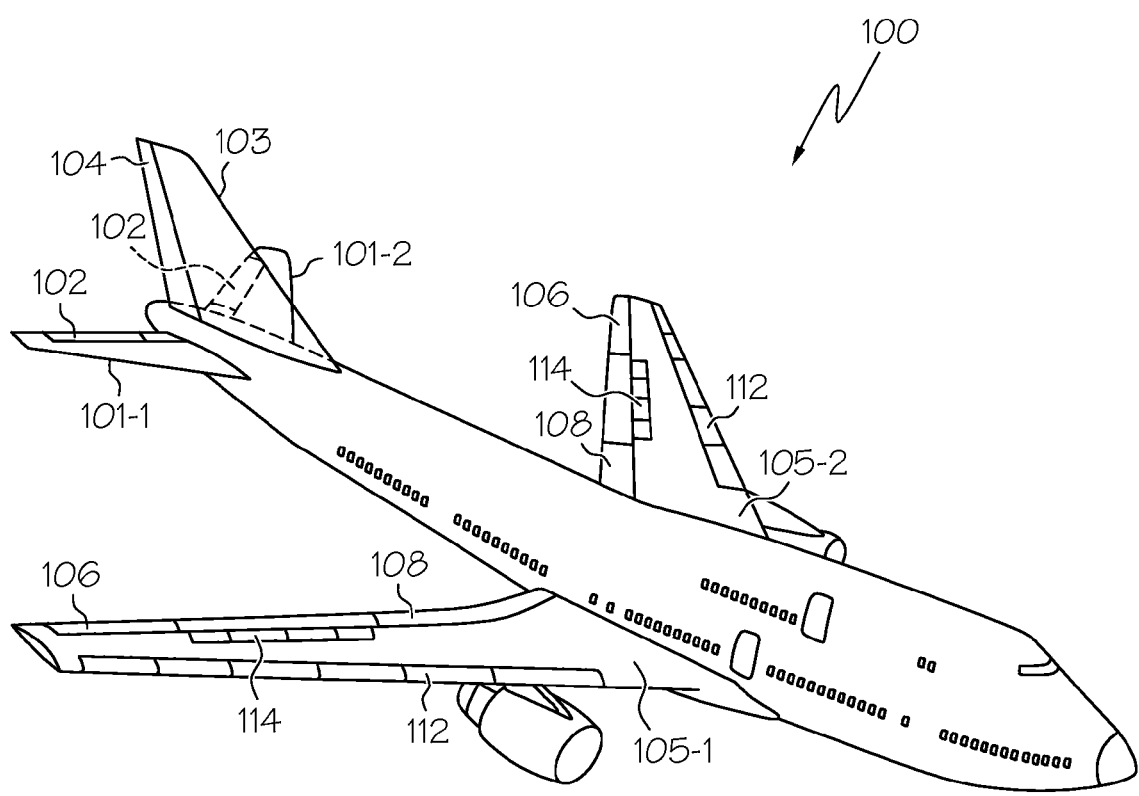
FIG. 1 is a perspective view of an exemplary fixed-wing aircraft depicting primary and secondary flight control surfaces.

Turning now to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend at a lower airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
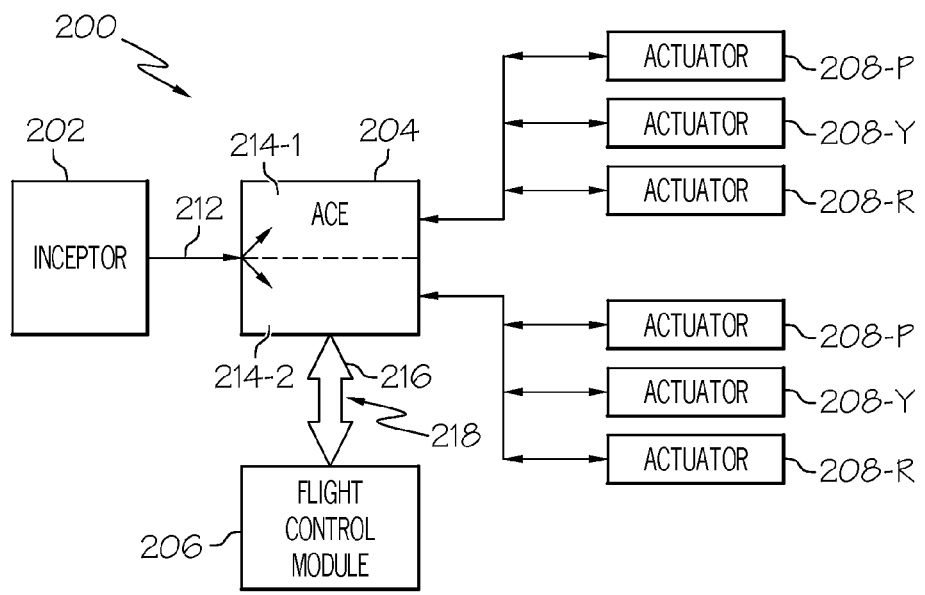
FIG. 2 is a simplified functional block diagram of an exemplary flight control surface actuation control system.

The flight control surfaces 102-114 are moved to commanded positions via a flight control surface actuation control system 200, an exemplary embodiment of which is shown in FIG. 2. In the depicted embodiment, the flight control surface actuation system 200 includes an inceptor 202, an actuator control unit 204, a flight control module 206, and a plurality of flight control surface actuators 208. Before describing the system 200 further, it is noted that only a single inceptor 202, a single actuator control unit 204, and a single flight control module 206 are depicted. However, in most embodiments, the system 200 includes a plurality of inceptors 202, a plurality of actuator control units 204, and a plurality of flight control modules 206.

Turning now to a description of the system 200, the inceptor 202 is configured to move in response to an input force supplied from, for example, a pilot. One or more non-illustrated position sensors sense the position of the inceptor 202, and supply inceptor position signals 212 representative of the sensed inceptor position. It will be appreciated that the inceptor 202 may be implemented using any one of numerous inceptor configurations including, for example, a side stick, a yoke, or a rudder pedal, just to name a few. It will additionally be appreciated that the inceptor 202 may be implemented as an active inceptor or a passive inceptor. No matter its specific implementation, the inceptor 202 supplies the inceptor position signals 212 to the actuator control unit 204.

The actuator control unit 204, which may also be referred to as an actuator control electronics (ACE) unit, is preferably implemented with a plurality of independent actuator control channels 214. It will be appreciated that the number of independent actuator control channels may vary, but in the depicted embodiment the actuator control unit 204 includes two independent actuator control channels 214 (e.g., 214-1, 214-2). In any case, each independent actuator control channel 214 is coupled to receive the pilot inceptor position signals 212 from the pilot inceptor 202, and flight control augmentation data 216 that are supplied from the flight control module 206. Each independent actuator control channel 214 is also preferably configured to control multiple actuators. In particular, each independent actuator control channel 214 is preferably configured to control one pitch axis flight control surface actuator 208-P (e.g., elevator actuator), one yaw axis flight control surface actuator 208-Y (e.g., rudder actuator), and one roll axis flight control surface actuator 208-R (e.g., aileron actuator). As will now be described, each actuator control channel 214 is configured to generate flight control surface actuator commands either based on the pilot inceptor position signals 212 and the flight control augmentation data 216, or based on only the pilot inceptor position signals 212.

During normal system 200 operations, the actuator control channels 214 generate the flight control surface actuator commands based on both the inceptor position signals 212 and the flight control augmentation data 216. The flight control augmentation data 216 that are supplied from the flight control module 206 augment the direct commands supplied from the pilot via the pilot inceptor 202 to smooth the flight of the aircraft. More specifically, when the actuator control channels 214 process the pilot inceptor position signals 212 and the flight control augmentation data 216, the flight control surface actuator commands that each channel 214 generates will ensure a smooth flight, enhance aircraft handling characteristics, and provide flight envelope protection. It may thus be appreciated that the flight control surface actuator commands that the actuator control channels 214 generate during normal system 200 operations are referred to herein as limited authority flight control surface actuator commands.

In the highly unlikely event that the flight control augmentation data 216 were to become unavailable, then the actuator control channels 214 will generate the flight control surface actuator commands based solely on the inceptor position signals 212. It is noted that this operational configuration is sometimes referred to as "direct mode" operation. It will be appreciated that the flight control augmentation data 216 may become unavailable, for example, in the highly unlikely event that the flight control module 206 was to become unavailable or otherwise inoperable. No matter the specific cause of such an highly unlikely event, because the flight control surface actuator commands that the actuator control channels 214 generate are no longer augmented, the commands are referred to herein as direct flight control surface actuator commands.

Figure 3:
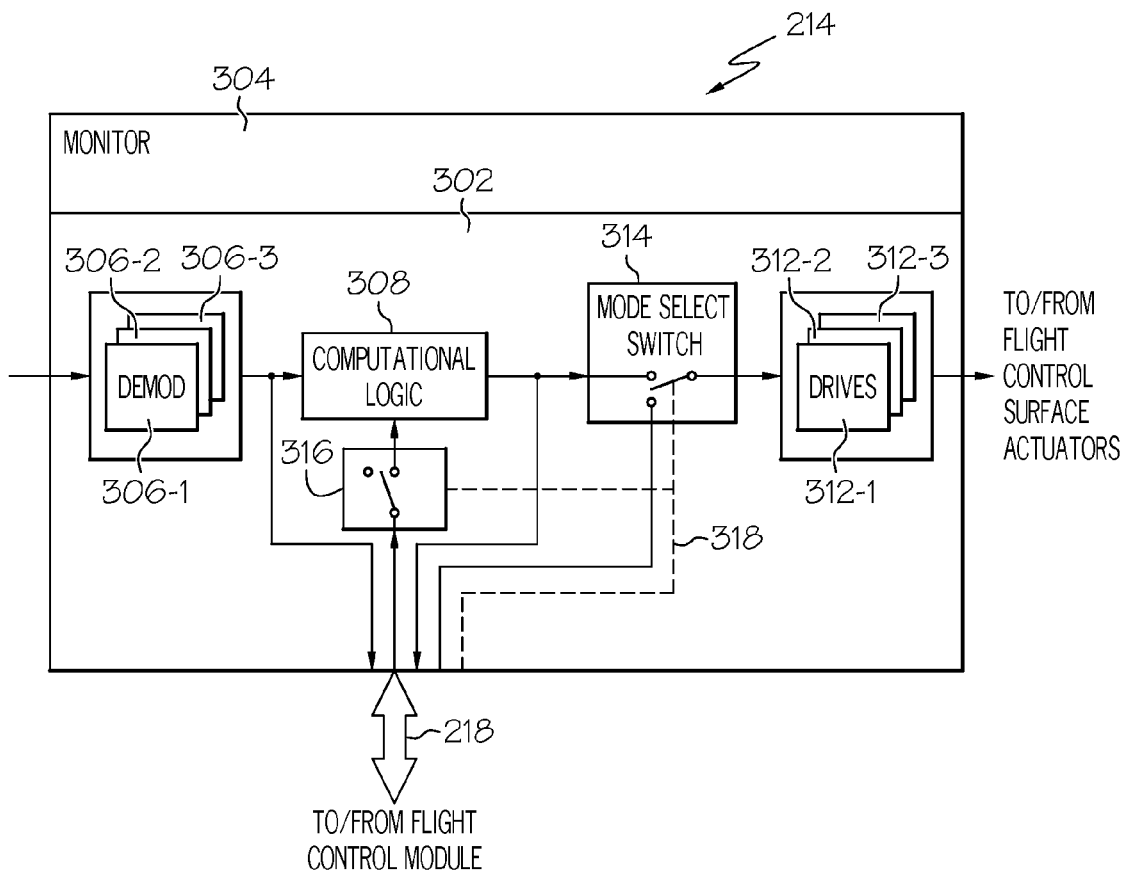
FIG. 3 is a functional block diagram of a single independent actuator control channel that may be used to implement the actuator control unit depicted in FIG. 2.

To implement the described functionality, and with reference now to FIG. 3, each independent actuator control channel 214 preferably includes two identical (or at least substantially identical) processing lanes, a command lane 302 and a monitor lane 304. This architecture ensures, among other things, that each independent actuator control channel 214 implements a fail-passive functionality. Although the details of only a single processing lane 302, 304 is depicted, the command and monitor processing lanes 302, 304 each include one or more inceptor demodulators 306, computational logic 308, and one or more output drives 312. The inceptor demodulators 306 are each coupled to receive and demodulate the inceptor position signals 212, and are each configured to supply appropriately conditioned pilot command signals to the computational logic 308. As may be appreciated, in a preferred embodiment the command and monitor lanes 302, 304 each include three intercept demodulators 306 (e.g., 306-1, 306-2, 306-3), one associated with each of the each controllable axis (e.g., pitch, yaw, roll). It will also be appreciated that this number of inceptor demodulators 306 may vary.

The computational logic 308 is coupled to receive the conditioned pilot signals from each of the inceptor demodulators 306, and the flight control augmentation data 216 from the flight control module 206. The computational logic 308, based on the conditioned pilot signals and the flight control augmentation data 216, calculates the appropriate flight control surface actuator commands. As noted above, during normal operations, when the flight control augmentation data 216 are supplied to each independent actuator control channel 214, the computational logic 308 calculates limited authority flight control surface actuator commands. Alternatively, in the highly unlikely event that the flight control augmentation data 216 are unavailable, the computational logic 308 calculates the above-described direct flight control surface actuator commands. It will be appreciated that the computational logic 308 may be implemented using various types and combinations of hardware, software, and firmware including, for example, suitable analog-to-digital conversion devices, digital-to-analog conversion devices, microprocessors, digital signal processors (DSPs), and programmable logic devices (PLDs).

No matter the specific hardware devices that are used to implement the computational logic 308, it is noted that in the preferred embodiment the computational logic 308 in each independent actuator control channel 214 is at least partially implemented with dissimilar hardware. That is, at least those portions of the computational logic 308 in each independent actuator control channel 214 that calculate the flight control surface actuator commands are implemented with devices that are designed and manufactured by different manufacturers. This mitigates the highly unlikely, yet postulated occurrence of a simultaneous generic fault in each independent actuator control channel 214. Thus, the actuator control unit 204 meets the standards for so-called "complex" devices as defined by DO-254. Before proceeding further it is noted that the computational logic 308 in the command and monitor processing lanes 302, 304 of an actuator control channel 214 need not be dissimilar, it is just the computational logic 308 between each independent actuator control channel 214 that is preferably dissimilar.

The flight control surface actuator commands that are computed in the computational logic 308 (both direct and limited authority flight control surface actuator commands) are supplied to the output drives 312. The output drives 312 appropriately amplify and condition the flight control surface actuator commands for transmission to the appropriate flight control surface actuators 208. As with the inceptor demodulators 306, it will be appreciated that in a preferred embodiment the command and monitor lanes 302, 304 each include three output drives 312 (e.g., 312-1, 312-2, 312-3), one associated with each of the each controllable axis (e.g., pitch, yaw, roll). It will also be appreciated that this number of output drives 312 may vary.

As FIG. 3 further depicts, in some embodiments each independent actuator control channel 214 may also include a mode select switch 314 and an augmentation on/off switch 316. The purpose and function of the mode select switch 314 and the augmentation on/off switch 316 will be described in greater detail further below. It will be appreciated that the mode select switches 314 and the augmentation on/off switches 316, though depicted and described herein as a separate device within each independent actuator control channel 214, could be implemented as part of the computational logic 308. Moreover, the mode select switches 314 and the augmentation on/off switches 316 could be implemented apart from the actuator control unit 204. It will additionally be appreciated that the mode select switch 314 and the augmentation on/off switches 316 could be implemented using any one of numerous suitable devices for carrying out the functions that are described further below. For example, the mode select switch 314 and the augmentation on/off switch 316 could be implemented using hardware, software, firmware, or various combinations thereof.

Returning now to FIG. 2, a brief description of the flight control module 206 will be provided. The flight control module 206 is in operable communication with the actuator control unit 204 via, for example, a suitable communication bus 218. The flight control module 206 is also coupled, via the same or a separate communication bus 218, to receive data representative of various aircraft conditions. These data may include, for example, various inertial and navigation data from non-illustrated sensors and avionics equipment. Some exemplary data include air speed, altitude, attitude, weather conditions, location, and heading, just to name a few. The flight control module 206, in response to these data, generates the flight control augmentation data 216 that are supplied to the actuator control unit 204.

In addition to generating the flight control augmentation data 216, the flight control module 206 is configured to determine the operability of each of the independent actuator control channels 214. Based on the determined operability of each independent actuator control channel 214, the flight control module 206 may selectively prevent one of the independent actuator control channels 214 from supplying limited authority flight control surface actuator commands to the associated flight control surface actuators 208. The manner in which the flight control module 206 determines the operability of each independent actuator control channel 214 may vary. However, in the depicted embodiment the flight control module 206 independently computes limited authority flight control surface actuator commands, and compares the commands it computes to the commands that are computed by the computational logic 308 in each independent actuator control channel 214. To do so, at least in the depicted embodiment, the flight control module 206 receives the conditioned pilot signals from the inceptor demodulators 306 in each actuator control channel 214, and the limited authority flight control surface actuator commands computed by the computational logic 308 in each actuator control channel 214 (see FIG. 3). The flight control module 206, using the conditioned pilot signals and the flight control augmentation data 216 that it generates, independently calculates limited authority flight control surface actuator commands. The flight control module 206 then compares the limited authority flight control surface actuator commands it computes to those that are computed by the computational logic 308 in each independent actuator control channel 214. If this comparison indicates that one of the independent actuator control channels 214 is faulty, unavailable, or otherwise inoperable, the flight control module 206 will prevent the faulty, unavailable, or otherwise inoperable actuator control channel 214 from supplying the limited authority flight control surface actuator commands to the associated flight control surface actuators 208

In some embodiments, the flight control system 200 may also be configured such that, in some instances, the flight control surface actuator commands supplied to the flight control surface actuators 208 may be based on the limited authority flight control surface commands calculated by the flight control module 206. It is noted that the flight control surface actuator commands that the flight control module 206 calculates during these instances are referred to herein as full authority flight control surface actuator commands, and the flight control system operational mode may be referred to as full authority mode. This is because the flight control module 206, during these instances, is not supplying flight control augmentation data 216 to the actuator control unit 204 and comparing independently calculated flight control surface actuator commands to those calculated in the actuator control unit 204. Rather, the flight control module 206 is actually calculating the flight control surface actuator commands that are used to move the flight control surface actuators 208 to the commanded positions. The circumstances under which the flight control system 200 is switched to operation in the full authority mode may vary, but it is preferably done so in response to a relatively highly unlikely event. For example, the flight control module 206 may determine, based on various inputs, that the aircraft is in, or is about to be placed in, an undesirable attitude or other configuration, and switch momentarily to the full authority mode to correct the configuration.

It will be appreciated that the full authority flight control surface actuator commands could be supplied directly from the flight control module 206 to the flight control surface actuators 208. In such embodiments, the flight control module 206 would include its own independent set of actuator drives. In the depicted embodiment, however, the full authority flight control surface actuator commands are supplied to the flight control surface actuators 208 via the mode select switch 314 in each of the independent actuator control channels 214. Moreover, when the full authority flight control surface actuator commands are being supplied by the flight control module, the augmentation on/off switch 316 prohibits the augmentation data from being supplied to each of the independent actuator control channels 214. With reference now to FIG. 3, the functions of the mode select switch 314 and the augmentation on/off switch 316, will now be described.

As FIG. 3 depicts, each mode select switch 314 is coupled to receive the limited authority flight control surface actuator commands calculated in its independent actuator control channel 214, the full authority flight control surface actuator commands calculated in the flight control module 206, and a mode select control signal 318 from the flight control module 206. The mode select switches 314 are operable, in response to the mode select control signal 318, to supply either the limited authority flight control surface actuator commands or the full authority flight control surface actuator commands to the appropriate output drives 312 for subsequent supply to the appropriate flight control surface actuators 208. As FIG. 3 further depicts, the augmentation on/off switches 316 also receive the mode select control signal 318 and, in response, either allow or prohibit the augmentation data from being supplied to the computational logic 308.

The above-described ACE 204 and FCM 206 configurations allow the flight control system 200 to be variously configured and variously operated. For example, the flight control system 200 may be configured to operate in what are referred to herein as a limited authority configuration, a full authority configuration, or a limited authority/short-term full authority configuration. Each of these configurations will now be briefly described, beginning with the limited authority configuration.

In the limited authority configuration, the mode select control signal 318 supplied from the flight control module 206 will cause the mode select switches 314 to always receive flight control surface actuator commands from the computational logic 308. However, depending on the position of augmentation data on/off switches 316, the flight control surface actuator commands supplied from the mode select switches 314 to the output drives 312 may be either limited authority flight control surface actuator commands or direct flight control surface actuator commands. Normally, the mode select control signal 318 supplied from the flight control module 206 will cause the augmentation data on/off switches 316 to supply the augmentation data to the computational logic 308. As a result, the flight control surface actuator commands will normally be limited authority flight control surface actuator commands. If, however, the flight control module 206 (or other circuit or device) determines that augmentation data need not or should not be supplied to the computational logic 308, then the mode select control signal 318 supplied from the flight control module 206 will cause augmentation data on/off switches 316 to be in a position in which the augmentation data are not supplied to the computational logic 308. As a result, the flight control surface actuator commands will be direct flight control surface actuator commands.

In the full authority configuration, the mode select control signal 318 supplied from the flight control module 206 will cause the augmentation data on/off switches 316 to always be in a position in which the augmentation data are not supplied to the computational logic 308. However, depending on the position of the mode select switches 314, the flight control surface actuator commands supplied from the mode select switches 314 to the output drives 312 may be either full authority flight control surface actuator commands or direct flight control surface actuator commands. Normally, the mode select control signal 318 supplied from the flight control module 206 will cause the mode select switches 314 to receive full authority flight control surface actuator commands from the flight control module 206. If, however, the flight control module 206 (or other circuit or device) determines that full authority flight control surface actuator commands need not or should not be supplied, then the mode select control signal 318 supplied from the flight control module 206 will cause the mode select switches 314 to be in a position in which the mode select switches 314 receive direct flight control surface actuator commands from the computational logic 308.

In the limited authority/short-term full authority configuration, the mode select control signal 318 supplied from the flight control module 206 will normally cause the mode select switches 314 to receive flight control surface actuator commands from the computational logic 308, and the augmentation data on/off switches 316 to be in positions to supply the augmentation to the computational logic 308. As a result, limited authority flight control surface actuator commands are normally supplied to the output drives 312. However, if the flight control module 206 (or other circuit or device) determines that the full authority flight control surface actuator commands need to be supplied to the flight control surface actuators 208, the flight control module 206 will supply the appropriate mode select control signal 318 to the mode select switches 314 and the augmentation on/off switches 316, to at least temporarily supply full authority flight control surface actuator commands to the output drives 312. It will be appreciated that in this limited authority/short-term authority configuration, if the flight control modules 206 become inoperable, then the flight control system 200 reconfigures itself, as described in the previous configurations above, to supply direct flight control surface actuator commands to the output drivers 312.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight control surface actuation control system, comprising:
    an actuator control unit including at least two independent actuator control channels, each independent actuator control channel coupled to receive pilot inceptor position signals and flight control augmentation data, each independent actuator control channel operable to generate limited authority flight control surface actuator commands based on the pilot inceptor position signals and the flight control augmentation data; and
    a flight control module in operable communication with the actuator control unit, the flight control module configured to (i) supply the flight control augmentation data to each of the independent actuator control channels, (ii) determine operability of each of the independent actuator control channels, and (iii) based on the determined operability of each independent actuator control channel, to selectively prevent one of the independent actuator control channels from supplying the limited authority flight control surface actuator commands.

2. The flight control system of claim 1, wherein the flight control module receives signals at least representative of the pilot inceptor position signals supplied to each independent actuator control channel and signals at least representative of the limited authority flight control surface actuator commands generated by each independent actuator control channel, and the flight control module is operable, in response to at least these signals, to determine the operability of each of the independent actuator control channels.

3. The flight control system of claim 2, wherein:
    the flight control module, in response to the signals at least representative of the pilot inceptor position signals and the augmentation data, generates limited authority flight control surface actuator commands; and
    the flight control module compares the limited authority flight control surface actuator commands it generates to the limited authority flight control surface actuator commands generated by each of the independent actuator control channels to determine the operability of each of the independent actuator control channels.

4. The flight control system of claim 1, wherein:
    each independent actuator control channel comprises command computation logic responsive to the pilot inceptor position signals and the flight control augmentation data to generate the limited authority flight control surface actuator commands; and
    the computation logic in each independent actuator control channel is at least partially implemented with dissimilar hardware.

5. The flight control system of claim 1, wherein the flight control module is further operable to selectively prevent the actuator control unit from supplying the limited authority flight control surface actuator commands.

6. The flight control system of claim 5, wherein the flight control module is further operable, at least upon preventing the actuator control unit from supplying the limited authority flight control surface actuator commands, to generate and supply full authority flight control surface actuator commands.

7. The flight control system of claim 6, wherein the flight control module is coupled to receive the pilot inceptor position signals and is operable, in response thereto, to generate the full authority flight control surface actuator commands.

8. The flight control system of claim 6, wherein:
    each independent actuator control channel comprises a mode select switch;
    each mode select switch is coupled to receive a mode select control signal, the flight control surface actuator commands from an independent actuator control channel, and the flight control surface actuator commands from the flight control module; and
    each mode select switch is operable, in response to the mode select control signal, to supply the flight control surface actuator commands from either the independent actuator control channel or the flight control module.

9. The flight control system of claim 1, wherein each independent actuator control channel is further operable, if the flight control augmentation data are unavailable, to generate flight control surface actuator commands based solely on the pilot inceptor position signals.

10. The flight control system of claim 1, wherein:
    each independent actuator control channel comprises two lanes of cross-compared computation logic; and
    each independent actuator control channel is configured to implement fail-passive functionality.

11. A flight control surface actuation control system, comprising:
    an actuator control unit coupled to receive pilot inceptor position signals and flight control augmentation data and operable to generate limited authority flight control surface actuator commands based on the pilot inceptor position signals and the flight control augmentation data;
    a flight control module in operable communication with the actuator control unit, the flight control module operable to (i) supply the flight control augmentation data to the actuator control unit, (ii) at least selectively generate full authority flight control surface actuator commands, and (iii) supply a mode select control signal; and
    a mode select switch coupled to receive the limited authority flight control surface actuator commands, the full authority flight control surface actuator commands, and the mode select control signal, the mode select switch operable, in response to the mode select control signal, to supply either the limited authority flight control surface actuator commands or the full authority flight control surface actuator commands.

12. The system of claim 11, wherein the actuator control unit comprises the mode select switch.

13. The flight control system of claim 11, wherein the flight control module is coupled to receive the pilot inceptor position signals and is operable, in response thereto, to generate the full authority flight control surface actuator commands.

14. The flight control system of claim 11, wherein the actuator control unit is further operable, if the flight control augmentation data are unavailable, to generate flight control surface actuator commands based solely on the pilot inceptor position signals.

15. The system of claim 11, wherein:
the actuator control unit includes at least two independent actuator control channels;
each independent actuator control channel is coupled to receive the pilot inceptor position signals and flight control augmentation data; and
each independent actuator control channel is operable to generate the limited authority flight control surface actuator commands based on the pilot inceptor position signals and the flight control augmentation data.

16. The flight control system of claim 15, wherein:
each independent actuator control channel comprises two lanes of cross-compared computation logic; and
each independent actuator control channel is configured to implement fail-passive functionality.

17. The flight control system of claim 15, wherein:
each independent actuator control channel comprises command computation logic responsive to pilot inceptor position signals and the flight control augmentation data to generate the limited authority flight control surface actuator commands; and
the computation logic in each independent actuator control channel is implemented with dissimilar hardware.

18. The system of claim 15, wherein the flight control module is configured to:
(i) supply the flight control augmentation data to each of the independent actuator control channels;
(ii) determine operability of each of the actuator control channels; and
(iii) based on the determined operability of each independent actuator control channel, to selectively prevent one of the independent actuator control channels from supplying the limited authority flight control surface actuator commands.

19. The flight control system of claim 18, wherein the flight control module receives signals at least representative of the pilot inceptor position signals supplied to each independent actuator control channel and signals at least representative of the limited authority flight control surface actuator commands generated by each independent actuator control channel, and the flight control module is operable, in response to at least these signals, to determine the operability of each of the independent actuator control channels.

20. The flight control system of claim 19, wherein:
the flight control module, in response to the signals at least representative of the pilot inceptor position signals and the augmentation data, generates limited authority flight control surface actuator commands; and
the flight control module compares the limited authority flight control surface actuator commands it generates to the flight control surface actuator commands generated by each of the independent actuator control channels to determine the operability of each of the independent actuator control channels.

* * * * *